US011289111B2

(12) United States Patent
Souissi

(10) Patent No.: US 11,289,111 B2
(45) Date of Patent: Mar. 29, 2022

(54) METHOD AND APPARATUS FOR MEASURING SOUND LEVELS

(71) Applicant: Slim Souissi, San Diego, CA (US)

(72) Inventor: Slim Souissi, San Diego, CA (US)

(73) Assignee: MIOTIV Inc, San Diego, CA (US)

( * ) Notice: Subject to any disclaimer, the term of this patent is extended or adjusted under 35 U.S.C. 154(b) by 0 days.

(21) Appl. No.: 16/410,014

(22) Filed: May 13, 2019

(65) Prior Publication Data

US 2020/0365171 A1 Nov. 19, 2020

(51) Int. Cl.
*G10L 25/51* (2013.01)
*G10L 21/10* (2013.01)
*H04R 3/00* (2006.01)
*H04R 1/40* (2006.01)

(52) U.S. Cl.
CPC .............. *G10L 25/51* (2013.01); *G10L 21/10* (2013.01); *H04R 1/406* (2013.01); *H04R 3/005* (2013.01)

(58) Field of Classification Search
USPC ........................... 381/56, 58, 61, 71.14, 94.8
See application file for complete search history.

(56) References Cited

U.S. PATENT DOCUMENTS

| 5,771,041 A | * | 6/1998 | Small | H04S 1/007 |
| | | | | 715/727 |
| 2009/0121826 A1 | * | 5/2009 | Song | A61B 5/4812 |
| | | | | 340/3.1 |
| 2016/0337774 A1 | * | 11/2016 | Farber | G06Q 30/0201 |
| 2018/0193198 A1 | * | 7/2018 | Li | G01S 3/80 |

* cited by examiner

*Primary Examiner* — Yosef K Laekemariam
(74) *Attorney, Agent, or Firm* — Pablo Meles

(57) ABSTRACT

A system for measuring sound levels is provided. The system comprises a processor, a memory, and an application stored in the memory that when executed on the processor receives sound levels recorded by each of a plurality of sound sensors located in a coverage area. The application also samples noise levels from the received sound levels at least one location within the coverage area. The application also derives values based at least on the samples and on estimates of sound attenuation at the at least one location. The application also creates a heat map based at least on the derived values, the heat map representing at least noise levels experienced within the coverage area.

9 Claims, 4 Drawing Sheets

METHOD AND APPARATUS FOR MEASURING SOUND LEVELS

FIELD OF THE APPLICATION

The present disclosure is in the field of sound measurement. More particularly, the present disclosure measures sound levels at various points within a coverage area, makes adjustments to measurements, and issues a heat map based on an estimate of quietness for the coverage area.

BACKGROUND

Hospitals are sensitive to minimizing noise in patient areas including patient rooms, intensive care wards, and operating room areas. Research indicates that patient experience is highly correlated to the level of noise experienced by patients during hospital stays.

Some public agencies use the Hospital Consumer Assessment of Healthcare Providers and Systems (HCAHPS) survey to reliably measure satisfaction. The survey contains at least one question about hospital quietness and is regarded as an important element of patient satisfaction.

Hospitals use best practices to manage noise levels including designating some areas within the hospital as quiet areas. Hospital staff is trained to ensure minimum levels of noise for the benefit of patient satisfaction which may lead to better hospital rankings. Good rankings have a direct relationship with HCAHPS scoring and consequently higher reimbursements from Medicare.

While noise management is important to hospitals, hospitals often lack tools to reliably assess levels of quiet and implement actions toward improvement. The healthcare market needs solutions allowing for automatic and reliable noise level measurement within designated hospital areas.

Previous implementations are mature and have been used extensively on construction sites and along highways where noise levels may be harmful. In the prior art, devices for measuring noise levels include the SPL 8810 provided by American Recorder Technologies which is depicted in FIG. 1. This device may measure sound levels between 30 dB and 130 dB and display measured data in decibels.

Other well-known methods in the prior art include the use of smartphone applications such at NIOSH Sound Level Meter and Decibel X apps. These methods rely on smartphone audio circuitry and software to measure noise levels to record or display sound data.

Sound measurement technology may also be integrated at a module level and made available to manufacturers to develop sound meters in various form factors. Such modules may be readily available from hardware manufacturers and can be procured from firms such as Digi-Key Corporation. Significant test equipment is also available that allows for measurement and analysis of sound levels.

Implementations in the prior art do not solve the problems presented by the hospital scenario. The previous implementations have been based on a single device or sensor that helps analyze a noise level at a single location with the assistance of a user operating the device.

DETAILED DESCRIPTION

Systems and methods described herein provide for capturing sound levels at various locations within a coverage area and applying techniques to determine an overall estimate of quietness for the area. In a healthcare environment, a coverage area may be a patient room in a hospital where it is important to minimize noise level.

Sound sensors are placed in various locations in the patient room. Sound levels are periodically taken by each sensor and transmitted to a computer. The computer analyzes the received sound levels and determines an estimate of quietness for the patient room. If the estimate of quietness exceeds a predetermined threshold, an alert may be generated. Action may be thereby prompted to reduce noise levels in and around the patient's room.

Sound sensors may be located in ceiling and other areas of a patient's room. But noise specialists are interested in noise levels specifically at the patient's location in the room, in his/her bed in most cases, perhaps eight feet lower than the level of the ceiling. Sound levels captured by sensors embedded into the ceiling and other locations away from the ceiling are therefore inaccurate and are subject to adjustment.

Distances are calculated between sound sensors and the occupant's usual location in the coverage area. In the case of a hospital patient, the area of the patient's head on the hospital bed would be the location of interest. The distance between the sensor and this location is calculated and used as a calibration factor. This factor is applied to sound measurements taken at the particular sensor to compensate for the sensor's distance from the patient's ear.

A patient room might for example have three sensors attached to the ceiling at distances of 8, 13, and 16 feet from the point where the patient's head rests on the bed. Sound measurements at each of these sensors are adjusted for their respective distances from the patient.

The sound measurements for a coverage area, having received adjustments, are then averaged or subjected to other statistical techniques, with the resulting estimate of quietness produced. A heat map may be generated from this process.

Figure 1:
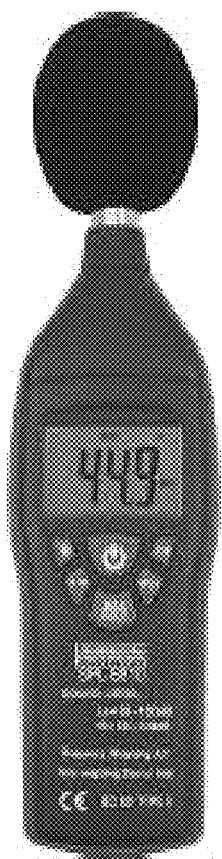
FIG. 1 is an image of a sound measurement device in accordance with the prior art.
Figure 2:
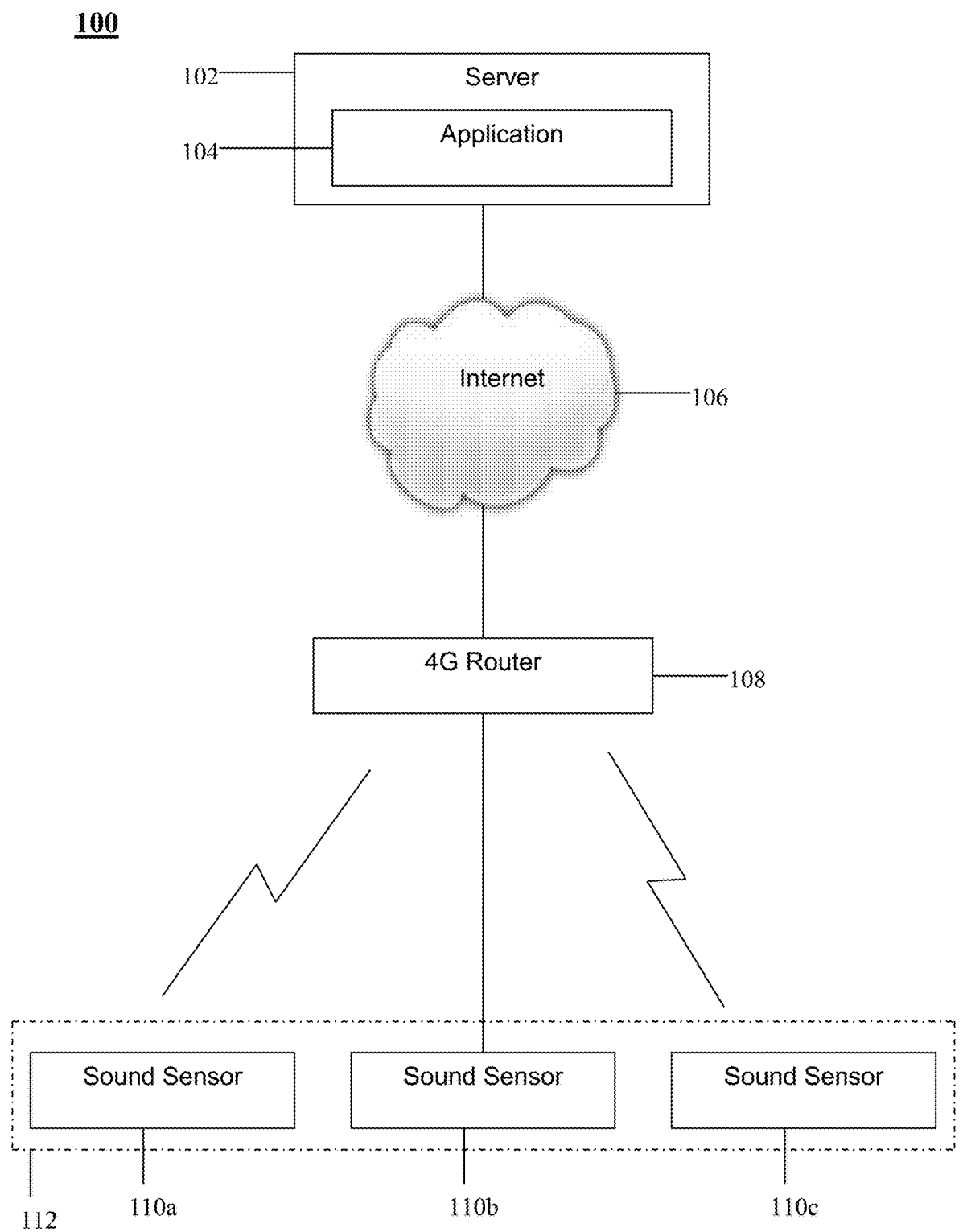
FIG. 2 is a block diagram of a system for measuring sound levels in accordance with an embodiment of the present disclosure.

Turning to the figures, FIG. 2 is a block diagram of a system for measuring sound levels according to an embodiment of the present disclosure. FIG. 2 depicts components and interactions of a system 100. System 100 comprises a server 102, an application 104, the Internet 106, a 4G router 108, sound sensors 110*a-c*, and a coverage area 112.

Discussion about one of the sound sensors 110*a-c* applies to all sound sensors 110*a-c* unless otherwise specifically stated. While three of sound sensors 110*a-c* are depicted as part of system 100, in embodiments more than or fewer than three of sound sensors 110*a-c* may be in effect.

The server 102 is a computer system that may be local to the coverage area or may be remote therefrom. The server 102 hosts the application 104 that performs many of the inventive actions described herein.

In an embodiment, more than one physical computer may function in the role of the server 102. In an embodiment, the application 104 may execute on more than one instance of the server 102. In an embodiment, more than one instance of the application 104 may be executing on the at least one instance of the server 102.

The Internet 106 is a global system of interconnected computer networks that use the Internet protocol suite (TCP/IP) to link devices worldwide. The 4G Router 108 is a networking device to speed the transmission of data from the sound sensors 110*a-c* to the server 102. The Internet 106 and the 4G Router 108 are optional components and not necessary when the server 102 is local to the coverage area 112. The sound sensors 110*a-c* may send sound data to the server 102 using various technologies including WiFI, Bluetooth, and Zwave.

Figure 3:
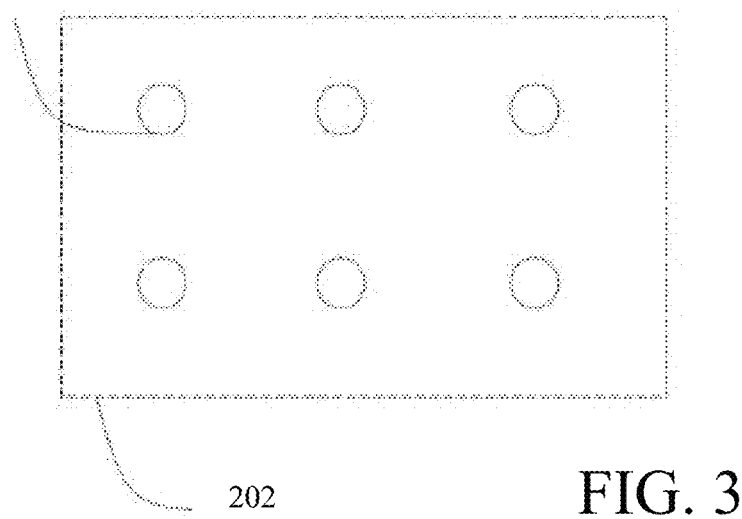
FIG. 3 is a diagram of a system for measuring sound levels in accordance with an embodiment of the present disclosure.

FIG. 3 is an image of a coverage area in accordance with an embodiment of the present disclosure. A system 200 is depicted in FIG. 3. Coverage area 202 equates to coverage area 112 of system 100. Sound sensor 204 equates to sound sensors 110*a-c* of system 100. While quantity six of sound sensors 204 are shown, only one is enumerated. Positioning of the six sound sensors 204 in the coverage area 202 of system 200 is for illustration purposes only as sensors 204 may be positioned in various manners.

Figure 4:
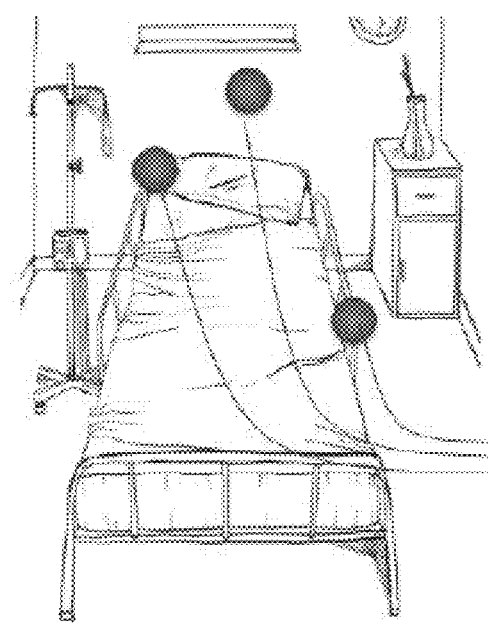
FIG. 4 is a diagram of a system for measuring sound levels in accordance with an embodiment of the present disclosure.
Figure 4:
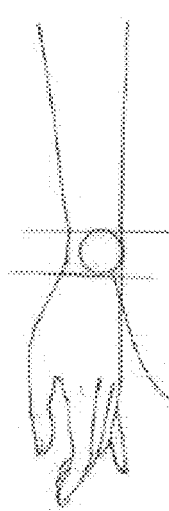

Sound sensors 110*a-c* may be installed within the patient bed or bracelet as close as possible to the patient ears to provide a good measurement of the noise experienced by the patient. FIG. 4 is an illustration of a system 300 in accordance with an embodiment of the present disclosure.

FIG. 4 depicts a hospital bed with quantity three instances of sound sensors 302 shown. One sensor 302 is affixed to a wall surface above the patient's head. A second sensor 302 is positioned on the bed very near the patient's head. And a third sensor 302 is positioned on a rail alongside the patient's bed. The other image in FIG. 4 depicts a patient's wristband with the sensor 302 attached to the wristband. Significantly smaller correlation factors would be needed when sensors 302 are positioned in the manners shown in FIG. 4 because of their proximity to the patient's ears.

The server 102 uses measurements of noise level to derive statistics, analytics, and notifications. The server 102 has knowledge of the location of each sensor 110*a-c* and estimates the sound level received by the patient. The server 102 creates a heat map describing sound levels in the coverage area 112.

Figure 5:
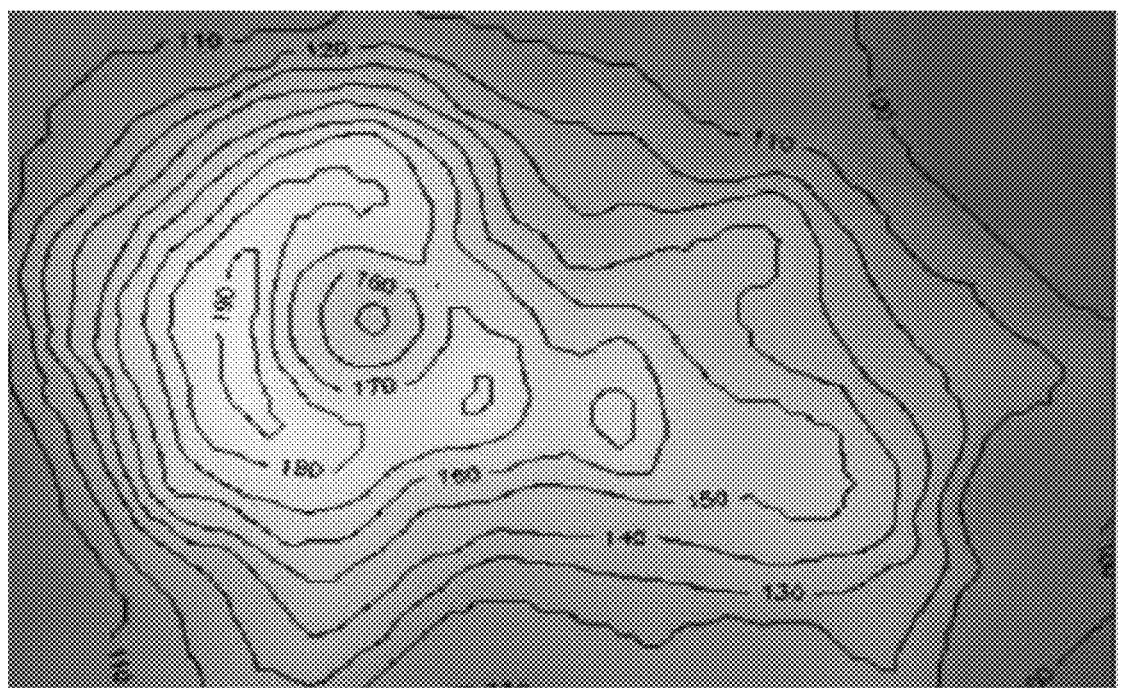
FIG. 5 is an image of a heat map in accordance with an embodiment of the present disclosure.

FIG. 5 is an image of a heat map according to an embodiment of the present disclosure. Contours depict equal sound levels. The heat map is created by sampling the noise levels at various locations by means of sound sensors 110*a-c* and deriving values based on estimates of sound attenuation at various locations in the coverage map.

The server 102 further calculates key performance indicators such as average sound level, medium sound level, peak sound level, and standard deviation of sound to provide measurable statistical for the estimate of quietness. Such measured parameters may be used by management of a hospital to take action and support quiet environments for patients.

Measured data may be averaged over time or shown as a function of location and time. Quietness may be visualized as a function of location or time. Thresholds may be set by hospital management to send notifications to appropriate personnel when noise levels exceed thresholds. Hospital management may use measured data to derive statistics about quietness and put in place corrective measures such as rewarding or penalizing staff for their efforts in managing noise and for redesigning coverage area 112 for better sound isolation and absorption.

As noted, calibration techniques may be used to adjust for situations in which sound sensors 110*a-c* are distant from the occupant's usual position in the coverage area 112. A correction factor Cf is the difference in measurement of sound at a sensor 110*a* and measurement of the same sound at the location of the patient. The sound level at the sensor 110*a* is adjusted using the correction factor Cf to arrive at a sound level as the patient would experience it. Radio and sound engineering professionals are skilled in the art of measuring signal and sound propagation as well as creating radio frequency and sound coverage maps. Such professionals may use a variety of techniques to accurately calculate calibration factors and estimate noise levels at various distances from a source of noise or from a receiver of noise.

The invention claimed is:

1. A system for measuring sound levels, comprising:
a processor;
a memory; and
an application stored in the memory that when executed on the processor:
  receives sound levels recorded concurrently by each of a plurality of sound sensors located in a coverage area in a room within a building;
  samples noise levels from the received sound levels from at least one location within the coverage area in the room;
  derives values based at least on the samples and on estimates of sound attenuation at the at least one location in the room; and
  creates a heat map based at least on the derived values, the heat map representing at least noise levels experienced within the coverage area of the room;
  wherein when the at least one location of a sensor is not proximate a projected position of an occupant of the room, calibration techniques are used to compensate for distance calculated between the location of the sensor and the projected position of the occupant of the room.

2. The system of claim 1, wherein the values comprise at least one of statistics, analytics, and notifications.

3. The system of claim 1, wherein the sound sensors periodically calculate decibel levels of noise in the coverage area and the system generates an alert if an estimate of quietness exceeds a predetermined threshold for the room.

4. The system of claim 1, wherein the application further calculates key performance indicators comprising at least one of average sound level, peak sound level, medium sound level, and standard deviation of sound.

5. The system of claim 1, wherein the application at least one of averages captured data over time and expresses the data as a function of location and time.

6. The system of claim 1, wherein the at least one location within the coverage area in the room is of a sensor installed within a patient bed or a patient bracelet.

7. The system of claim 1, wherein the at least one location within the coverage area in the room is of a sensor installed within a patient bed.

8. The system of claim 1, wherein the at least one location within the coverage area in the room is of a sensor installed within a patient bracelet.

9. The system of claim 1, wherein the calibration techniques uses distances between a patient's head resting on a bed within the room and each of the sensors in the plurality of sound sensors to apply as a calibration factor.

* * * * *